Patented Dec. 15, 1953

2,662,917

UNITED STATES PATENT OFFICE 2,662,917

PRODUCTION OF THIONOPHOSPHORUS COMPOUNDS

Warren L. Jensen, Ponca City, Okla., assignor to Continental Oil Company, Ponca City, Okla., a corporation of Delaware No Drawing. Application November 24, 1951,
Serial No. 258,087

7 Claims. (Cl. 260—543)

This invention is concerned with an improved process for the preparation of aromatic thionophosphonyl halides; and certain of such compounds and their derivatives as new compositions of matter.

The products of this invention are useful intermediates for the preparation of insecticides, plasticizers, textile treating agents, heat transfer and hydraulic fluids, etc.

The organophosphorus compounds are not to be confused with the well known phosphite, phosphate, or thiophosphate type compounds which have an oxygen or sulfur linkage between the phosphorus and the organic group. The organophosphorus compounds have a phosphorus to carbon bond and, consequently, they have a much higher degree of stability. The organothionophosphorus compounds with which the present invention is concerned are similarly constituted with respect to the carbon-phosphorus bond, and additionally contain sulfur as a thiono substituent wholly bound to the phosphorus atom.

The compounds of my invention and the compounds generally produced by my improved process are all characterized by the following structure:

wherein R is an aromatic radical directly bonded to phosphorus, $x$ and $y$ are 1 or 2, and $x$ and $y$ always equal 3.

The generally accepted method of preparing aromatic thionophosphonyl chlorides involves first the synthesis and isolation of a pure aromatic dichlorophosphine. For instance, the reaction of benzene with phosphorus trichloride catalyzed by anhydrous aluminum chloride is known to produce the phenyl chlorophosphines. A wide variety of aromatic chlorophosphines have been prepared in this manner. Specific examples of the halophosphines include ethyldichlorophosphine, butyldibromophosphine, benzyldichlorophosphine, tolyldichlorophosphine, isopropylphenyldichlorophosphine, naphthyldibromophosphine, methylethylbromophosphine, methyl phenylchlorophosphine, di(chlorophenyl)bromophosphine, dinaphthylchlorophosphine, etc. For detailed information regarding the preparation of these compounds, reference may be had to Textbook of Inorganic Chemistry, vol. II, part 3, written by A. E. Goddard and edited by J. N. Friend (1936); and Organophosphorus Compounds, G. M. Kosolapoff, published by Wiley & Sons, 1950. While the reaction appears to be simple and reasonably pure products have been obtained, nevertheless the product yields have been poor, usually below 20-25 per cent and often below 10 per cent. The reason for such low yields is not from lack of condensation between the aromatic hydrocarbon and phosphorus trichloride, but rather with the isolation of the chlorophosphine product from the reaction mass wherein it forms a very stable complex with the aluminum chloride catalyst. Solvent extraction has been used for isolating the aromatic chlorophosphines from the catalyst-product complex. The reaction mass is repeatedly extracted with a solvent, such as petroleum ether and hexane, and the product is obtained by distilling the solvent from the extract solution. The extraction procedure produces a pure product amounting only to a small proportion of the theoretical yield.

Another method consists in separating the complex by hydrolyzing the reaction mass with excess water, but this does not give the aromatic chlorophosphine in any appreciable yield since this product is also readily hydrolyzed, forming the corresponding phosphonous acid. Using a minimum of three moles of water per mole of the aluminum chloride present, just sufficient to form a filterable solid hydrate of it, also is not effective for isolating the aromatic chlorophosphines in an amount sufficient to produce the high yields of its thiono derivatives which I have secured according to my invention. Therefore, both the nature of the catalyst-product complex and the sensitivity of its components to water cause the yields of the separately isolated organic chlorophosphines to be only a small fraction of the theoretically expected yield.

Even assuming that the aromatic chlorophosphines could be produced satisfactorily by the known methods, their sulfurization to the corresponding thionophosphonyl chlorides has presented further difficulties. For example, the known procedure employing elemental sulfur for the purpose requires so high a temperature, 150° C. and higher, that the reaction frequently becomes violent and dangerous with temperatures rising exothermically to over 200° C. Such conditions are degradative to product yields.

It is apparent that prior workers had deemed it necessary to separately prepare and isolate the aromatic chlorophosphines and then convert them to the corresponding thiono derivatives.

I have discovered that the sulfurization of organohalophosphines is unexpectedly catalyzed by small amounts of a polyvalent metal halide. The reaction proceeds smoothly. The exothermic nature of the reaction is readily controlled. It will be observed that the broad process of my invention embodies two forms depending upon whether I employ the complex as above described or the isolated organic halophosphine.

*Utilizing organic halophosphine polyvalent metal complexes*

I have discovered that the complex described above need not be separated but, if sulfurized, can then be hydrolyzed to produce high yields of aromatic thionophosphonyl chlorides. This is a simplified, safe procedure. Moreover, the separation and handling of the toxic and malodorous dichlorophosphines is avoided.

In detail, my improved process may be defined as comprising the steps of reacting an aromatic compound with a phosphorus chloride in the presence of a catalyst, producing the complex referred to above, sulfurizing substantially the entire reaction mass which includes such complex, and then hydrolyzing the sulfurized reaction mass to make possible the recovery of high yields of the desired reaction product. Under certain conditions and especially when using certain sulfurizing reagents, the latter may be admixed with the aromatic material and phosphorus chloride and a sulfurized reaction mass produced in one step which then may be hydrolyzed to yield the end product.

The several steps of my process will first be dealt with generally and then illustrated by several specific examples.

The aromatic compounds which I employ in accordance with my invention are generally the aromatic hydrocarbons. Examples of these include benzene, naphthalene, and the alkaryl compounds such as toluene, ethylbenzene, cumene, m-xylene, dodecylbenzene, wax substituted benzene and toluene, etc. Waxbenzene is an example of a high molecular weight compound from which prior methods fail to produce thionophosphonyl halides. It is also possible by the practice of my invention to produce the thionophosphonyl halides of aromatic compounds containing non-hydrocarbon substituents containing other elements such as oxygen, sulfur, nitrogen, halogens, etc.

Having formed the aromatic thionophosphonyl halides according to my improved method, it is also possible to introduce non-hydrocarbon substituents into the organic portion of the molecule, for example, by nitration, chlorination, sulfonation, etc.

The conditions to be observed in reacting the organic material with the phosphorus trichloride are those usually observed in conventional alkylation reactions including the catalysts generally used therein.

The catalyst which I have found to be most effective for my purposes is anhydrous aluminum chloride. Aluminum bromide is also effective but less so than aluminum chloride. I have also used other polyvalent metal halides, such as $BF_3$, $FeCl_3$, and $ZnCl_2$. The optimum amount of aluminum chloride is about one mole for each mole of the aromatic compound used.

The sulfurizing agents I may employ are elemental sulfur, thiophosphoryl chloride, the sulfides of phosphorus such as $P_2S_5$, or the sulfur chlorides. Of these, however, I prefer to use sulfur.

The temperatures maintained in the process may vary between 0° C. and about 90° C. However, for best results, the temperature should not exceed about 80° C. As will be shown later, I have also found that the higher the molecular weight or complexity of the organic raw material, lower temperatures are needed for some types of compounds. For example, the higher temperature is used with benzene; however for the conversion of waxbenzene to dichloro thiophosphorus compounds, a lower temperature, say 0–50° C. and preferably 20–30° C., is used.

Specific examples illustrating my invention are given hereinafter and while they illustrate the production of preferred chlorine-containing thionophosphonyl derivatives, other halogen-containing compounds may be prepared by using the appropriate halogen-reaction component.

EXAMPLE I

*Preparation of benzenethionophosphonyl dichloride*

A 500-ml., 3-necked flask was fitted with a stirrer, a thermometer, and a water condenser to which was attached a calcium chloride drying tube open to the atmosphere. In this flask were placed 23 grams (0.3 mole) of benzene, 124 grams (0.9 mole) of phosphorus trichloride, and 40 grams (0.3 mole) of anhydrous aluminum chloride. This mixture was stirred and heated at reflux for three hours. The reaction mixture was then cooled to about 30° C. and 10 grams (0.31 mole) of flowers of sulfur was added. This addition caused a short vigorous exothermic reaction which increased the temperature of the mixture to about 60° C. and changed the color from a light yellow to a gray-brown color. The completion of this brief reaction was noted by a decrease in temperature after which the mixture was heated to 80° C. for 2–3 minutes. The excess phosphorus trichloride was then distilled off at reduced pressure and the remainder poured into ice. The resulting mixture was extracted with two portions of A. S. T. M. naphtha. The solvent extracts were combined, washed with water, and filtered. The naphtha was removed from the filtrate by distillation at reduced pressure. Further distillation gave 46.7 grams (73.8 per cent yield based on the benzene used) of a clear liquid which distilled at 95–110° C. (2–3 mm.). This product was the desired benzenethionophosphonyl dichloride. Analysis of this product gave 14.2 per cent P, 15.2 per cent S, and 34.4 per cent Cl. The theoretical values for this compound, $C_6H_5PSCl_2$, are 14.7 per cent P, 15.2 per cent S, and 33.6 per cent Cl. A residue from the above distillation weighed 3.3 grams and was chiefly dibenzenethionophosphonyl chloride, $(C_6H_5)_2PSCl$.

The temperature of the reaction must be kept below about 90° C. Temperatures above about 90° C., particularly in the presence of aluminum chloride, cause secondary reactions and loss of desired products. The success of the sulfurization of the organic dichlorophosphine-catalyst complex described above is due to the unexpected catalysis of this reaction by aluminum chloride operating at temperatures substantially below that used in prior art methods.

Several variations in the above procedure have been tried. The use of a large excess of sulfur was found to be of no benefit. If the sulfur is added immediately on formation of the initial reaction mixture, the consequence is lower yields. When the benzenethionophosphonyl dichloride is isolated by solvent extraction, rather than by first hydrolyzing and then extracting, poor yields are also obtained. Although the aromatic thionophosphonyl chlorides form complexes with the aluminum chloride, these compounds are stable to water at room temperature; hence the complex can be readily decomposed without appreciable loss of the organic product.

EXAMPLE II

*Effect of catalyst concentration*

A study was made in which the quantity of aluminum chloride was varied in the preparation of benzene thionophosphonyl dichloride but conditions otherwise held as described in Example I. The results of this work are collected in Table I.

TABLE I

*The effect of different amounts of aluminum chloride*

| Moles $AlCl_3$/mole $C_6H_6$ | Percent yield benzenethionophosphonyl dichloride [1] |
|---|---|
| 0.25 | 29 |
| 0.50 | 50 |
| 0.75 | 65 |
| 1.00 | 76 |
| 2.00 | 80 |

[1] Based on the benzene used.

From this it can be seen that the optimum proportion of catalyst is at least about one mole per mole of aromatic starting material.

EXAMPLE III

*Preparation of alkaryl thionophosphonyl dichlorides*

Experiments using the same molar quantities and the same procedure as described in Example I for benzene were made with several pure alkyl substituted benzene compounds. The results are listed below in Table II.

TABLE II

*Alkaryl thionophosphonyl dichlorides*

| Aromatic compound used | Product | |
|---|---|---|
| | Weight, g. | Percent yield [1] |
| Toluene | 28.0 | 59.4 |
| Ethylbenzene | 35.7 | 49.8 |
| Cumene (isopropylbenzene) | 29.5 | 38.0 |
| m-Xylene | 25.7 | 35.8 |

[1] Based on the amount of hydrocarbon used. See Tables VI and VII for the properties of these compounds.

The preceding examples have established the use of elemental sulfur as the sulfurizing agent. In examples to follow, other sulfurizing agents are shown to be effective.

EXAMPLE IV

*The sulfurizing agent is $PSCl_3$*

In the same apparatus described in Example I, a mixture of 23 grams (0.3 mole) of benzene, 82 grams (0.6 mole) of phosphorus trichloride, 51 grams (0.3 mole) of thiophosphoryl chloride, and 40 grams (0.3 mole) of aluminum chloride was stirred and heated at reflux for three hours. The excess phosphorus trichloride was then removed by vacuum distillation and the residue poured onto ice. The resulting mixture was extracted twice with A. S. T. M. naphtha. The extracts were combined, washed with water, and filtered. After the naphtha was removed by evaporation and distillation at reduced pressure, the benzenethionophosphonyl dichloride was obtained by vacuum distillation. It weighed 41.5 grams (65.6 per cent yield based on the benzene used). A residue of 7.2 grams remained after the distillation.

The effect of different reaction periods in the foregoing reaction is shown below in Table III.

TABLE III

*The effect of different reaction periods*

| Reaction period, hours | Percent yield benzenethionophosphonyl dichloride [1] |
|---|---|
| 1 | 52.9 |
| 2 | 62.9 |
| 3 | 67.3 |
| 6 | 66.3 |
| 8 | 66.5 |
| 9 | 64.9 |

[1] Based on the benzene used.

Note that the optimum reaction time appears to be about 3 hours. This is generally true for the reaction regardless of sulfurizing used.

It was noted in the course of the work of Example IV that the hydrogen chloride which evolves during the reaction between the aromatic compound and $PCl_3$ appears to be complete in about one-half hour. A check on this observation was made by measuring the hydrogen chloride produced during the course of the reaction. The data is given below in Table IV.

TABLE IV

*The evolution of hydrogen chloride*

| Total reaction time, hours | HCl evolved per interval, moles | Total HCl evolved, moles |
|---|---|---|
| ½ | 0.255 | 0.255 |
| 1 | 0.015 | 0.270 |
| 2 | 0.010 | 0.280 |
| 3 | 0.003 | 0.283 |

The use of more than about one mole of thiophosphoryl chloride per mole of aromatic compound was found to be of no benefit. The effect of different amounts of phosphorus trichloride with this optimum of thiophosphoryl chloride is shown in Table V.

TABLE V

*The effect of different amounts of phosphorus trichloride*

| Moles $PCl_3$/mole benzene | Percent yield benzenethionophosphonyl dichloride [1] |
|---|---|
| 1 | 52.5 |
| 2 | 65.6 |
| 3 | 65.5 |

[1] Based on the benzene used.

Thus it appears from Table V, when thiophosphoryl chloride is used to supply sulfur to the reaction that the optimum amount of phosphorus trichloride is about 2 moles per mole of aromatic materials reacted therewith. However, when elemental sulfur is used instead of thiophosphoryl chloride, the optimum proportion of phosphorus trichloride is then about three moles per mole of aromatic reacted.

Several other experiments were made wherein the thiophosphoryl chloride was added after the rest of the reagents had been reacted for a period of three hours. However, unlike the reaction using elemental sulfur, it was found as shown above that thiophosphoryl chloride may be added in the preparation of the mixture before reaction without incurring a decreased product yield thereby.

EXAMPLE V

*Preparation of other $RPSCl_2$ compounds*

Several other pure hydrocarbons were reacted under the conditions of the first paragraph of Example IV. The results are shown below in Table VI with the analyses of the various products shown in Table VII.

TABLE VI

*Product data of prepared alkarylthionophosphonyl dichlorides*

| Alkaryl compound | Product | | |
| --- | --- | --- | --- |
| | Weight, g. | B. P., ° C. | Percent yield |
| Toluene | 24.1 | 118–121 (2 mm.) | 35.7 |
| Ethylbenzene | 24.4 | 117–119 (1 mm.) | 34.0 |
| Cumene (isopropylbenzene) | 28.6 | 115–117 (1 mm.) | 37.7 |
| m-Xylene | 12.4 | 121–122 (2 mm.) | 17.3 |

TABLE VII

*Analyses of alkarylthionophosphonyl dichlorides*

| Hydrocarbon | Found | | | Calculated | | |
| --- | --- | --- | --- | --- | --- | --- |
| | Percent P | Percent S | Percent Cl | Percent P | Percent S | Percent Cl |
| Toluene | 13.5 | 14.4 | 31.1 | 13.8 | 14.2 | 31.5 |
| Ethylbenzene | 12.8 | 13.5 | 28.6 | 13.0 | 13.4 | 29.7 |
| Cumene | 11.6 | 12.8 | 28.3 | 12.2 | 12.6 | 28.1 |
| m-Xylene | 12.2 | 13.3 | 27.3 | 13.0 | 13.4 | 29.7 |

The thionophosphonyl dichlorides obtained with pure alkaryls presumably are mixtures of the possible isomers. This fact, of course, is not reflected in the chemical analyses. These analyses agree well with the theoretical values.

EXAMPLE VI

*Preparation of waxbenzenethionophosphonyl dichlorides*

Waxbenzene which had been prepared by a Friedel-Crafts alkylation of benzene with chlorinated wax (16.39 per cent Cl) in the proportions of one mole per one gram atom chlorine equivalent respectively, was used as the raw material for the following conversion reactions.

A. PREFERRED OPERATING CONDITIONS FOR THE DICHLORO THIOPHOSPHORUS PRODUCT

In an apparatus larger than that described in Example I, a mixture of 1000 grams (about 2.3 moles) of waxbenzene, 948 grams (6.9 moles) of phosphorus trichloride, and 307 grams (2.3 moles) of anhydrous aluminum chloride was stirred for three hours at room temperature. During the first part of this period the temperature of the mixture increased a few degrees. Then 150 grams (4.7 moles) of sulfur was added and the mixture heated to 45–50° C. with a micro-burner. The burner was removed and the mixture stirred for one hour. Following this reaction, the excess phosphorus trichloride was removed from the reaction mixture by vacuum distillation and the remainder was poured into water to hydrolyze the aluminum chloride. The water-insoluble portion was diluted with naphtha and the resulting solution was separated from the water and filtered through clay. The naphtha was then removed by vacuum distillation. There remained 1240 grams of a clear light brown oil. Analyses obtained for this product were as follows: Per cent P=4.86, per cent S=5.10, and per cent Cl=11.05 from which the ratio of P:S:Cl is 1.00:1.01:1.99. The analytical values are in close agreement with theoretical values of 5.45 per cent P, 5.62 per cent S, and 12.50 per cent Cl required for the dichloro compounds and indicates a product purity of about 97 per cent.

High molecular weight aromatic compounds such as waxbenzene require a further control of reaction temperature depending on whether monochloro or dichloro products are desired. The dichloro products are produced when the reaction does not exceed about 50° C. as demonstrated by the above preparation. The monochloroproduct may be produced according to Example X by using a reaction temperature between about 50° C. and 90° C.

B. EFFECT OF CATALYST

The effect of catalyst proportion on the above reaction was examined. The results of decreasing the amount of aluminum chloride used in the foregoing preparation are shown in Table VIII below. In these particular experiments, 100 grams (about 0.23 mole) of waxbenzene, 96 grams (0.70 mole) of phosphorus trichloride, and 15 grams (0.47 mole) of sulfur were used; reaction temperature did not exceed 50° C.

TABLE VIII

*The effect of different amounts of aluminum chloride in the reaction with waxbenzene (0.23 mole)*

| Amount of $AlCl_3$ | | Analysis of product | | | Ratio | | |
| --- | --- | --- | --- | --- | --- | --- | --- |
| Grams | Mole | Percent P | Percent S | Percent Cl | P: | S: | Cl |
| 31 | 0.23 | 4.45 | 4.61 | 9.58 | 1.00 | 1.00 | 1.88 |
| 23 | 0.17 | 3.96 | 1.43 | 7.10 | 1.00 | 0.35 | 1.57 |
| 12 | 0.09 | 2.18 | 2.52 | 3.50 | 1.00 | 1.13 | 1.40 |

Thus it can be seen that about one mole of the catalyst per mole of the waxbenzene is optimum for maximum conversion to the thiophosphonyl compounds.

EXAMPLE VII

*The sulfurizing agent is $P_2S_5$*

In the same apparatus described in Example I, a mixture of 23.4 grams (0.3 mole) of benzene, 124 grams (0.9 mole) of phosphorus trichloride, and 40 grams (0.3 mole) of anhydrous aluminum chloride was stirred and heated at reflux, about 76° C., for three hours. The reaction mixture was then allowed to cool to 40° C. when 66.3 grams (0.3 mole) of phosphorus pentasulfide was added. The temperature of the resulting mixture increased exothermically to 47° C. after which external heat was applied and the whole refluxed for ten minutes. For isolation, the mixture was vacuum evaporated to remove excess phosphorus trichloride. It was then poured onto cracked ice, extracted with naphtha, and the product-naphtha extract dried by clay filtration. The naphtha was removed by vacuum distillation. Further distillation gave a benzenethionophosphonyl chloride fraction in satisfactory yield.

EXAMPLE VIII

*The sulfurizing agent is $S_2Cl_2$: benzenethionophosphonyl dichloride*

A 500-ml., 3-necked flask was fitted with a stirrer, a thermometer, and a water condenser closed with a calcium chloride drying tube. In this apparatus a mixture of 39 grams (0.5 mole) of benzene, 206 grams (1.5 moles) of phosphorus trichloride, and 67 grams (0.5 mole) of anhydrous aluminum chloride was stirred and heated at reflux for three hours. The reacted mixture was then cooled to room temperature and 27 grams of sulfur monochloride containing 0.4 atom equivalents of sulfur was added dropwise. There was a vigorous exothermic reaction as each drop was added. In order to keep the temperature below 50° C., the reaction flask was cooled with an ice bath. After all of the sulfur monochloride was added, the mixture was heated to 70° C. for 3–4 minutes. Benzenethionophosphonyl dichloride was then isolated in the following way. The excess phosphorus trichloride was removed by distillation at reduced pressure and the remaining product-complex was poured onto ice. The resulting mixture was extracted with two portions of naphtha. The extracts were combined, washed with water, and filtered. The naphtha was then removed from the crude product by distillation at reduced pressure. Further distillation of the crude product gave 40.6 grams (58 per cent of theoretical yield) benzenethionophosphonyl dichloride, a clear liquid which distilled at 95–110° C. (2–3 mm. Hg).

No attempt was made to isolate a byproduct, $C_6H_5PCl_4$, which forms by the use of $S_2Cl_2$ as the sulfurizing agent. Its separation from the benzenethionophosphonyl dichloride occurred during the hydrolysis of the reaction complex wherein it was also hydrolyzed to form the water soluble benzenephosphonic acid.

EXAMPLE IX

*The sulfurizing agent is $S_2Cl_2$: waxbenzenethionophosphonyl dichloride*

A mixture of 100 grams (about 0.23 mole) waxbenzene, 94.8 grams (0.69 mole) phosphorus trichloride, and 30.7 grams (0.23 mole) anhydrous aluminum chloride was stirred at room temperature for three hours. There was added dropwise to this reaction mass 10.4 grams (0.08 mole) sulfur monochloride during a 10-minute period. The resulting exothermic reaction raised the temperature to 40° C. where it was held by further heating for 30 minutes. This reaction mass was poured into water to hydrolyze the catalyst and the excess phosphorus trichloride thus freeing the organic product, crude waxbenzenethionophosphonyl dichloride. The product was extracted from this aqueous mixture with naphtha. The product-naphtha extract solution was dried by clay filtration. The naphtha was removed from the filtrate by vacuum evaporation. The product thus obtained amounted to 88 grams of a clear yellow-brown oil. Analysis of this product gave 4.29 per cent phosphorus, 2.18 per cent sulfur, and 4.44 per cent chlorine.

This product is a mixture of waxbenethionophosphonyl dichloride with a minor proportion of waxbenzenephosphonic acid (by hydrolysis of the corresponding tetrachlorophosphine, $RPCl_4$, a characteristic byproduct of $S_2Cl_2$). However, note from the analysis that the S:Cl atomic ratio is 1.0:1.8, which agrees well for the theoretical value of 1:2.

EXAMPLE X

*Preparation of di(waxbenzene)thionophosphonyl monochloride wherein elemental sulfur is used*

A mixture of 100 grams (0.23 mole) waxbenzene, 96 grams (0.69 mole) phosphorus trichloride, and 31 grams (0.23 mole) aluminum chloride was stirred for 3 hours at reflux (pot temperature 85–90° C.). Then 8 grams (0.25 mole) of sulfur was added and the mixture was heated at 90° C. for 15 minutes. The product was isolated by hydrolysis with water and naphtha extraction followed by vacuum stripping of the naphtha. The yield of product, identified as di(waxbenzene)thionophosphonyl monochloride, was 98 grams of a light red oil. Analysis gave: Per cent P=5.20, per cent S=4.12, and per cent Cl=5.98. The atomic ratio of P:S:Cl calculated from the analytical values is 1.0:0.8:1.0, which corresponds closely to the theoretical ratio for the monochloride of structure, $R_2PSCl$.

EXAMPLE XI

*The catalyst is aluminum bromide: benzenethionophosphonyl dichloride*

A mixture of 23.4 grams (27 ml., 0.3 mole) benzene, 123.6 grams (78 ml., 0.9 mole) phosphorus trichloride, 81.3 grams (0.3 mole) aluminum bromide was reacted at reflux boiling for 3 hours. The reaction mass was then cooled to 60° C. and 10 grams (0.31 mole) of sulfur was added. An exothermic reaction occurred after which the mixture was hydrolyzed by pouring into cold water. The product was extracted from the aqueous mixture with naphtha. The extract was distilled under vacuum. The yield of the benzenethionophosphonyl dichloride fraction was 13.4 grams amounting to 24.1 per cent of the theoretical value. Thus it is seen that aluminum bromide is not as effective as aluminum chloride for this purpose.

EXAMPLE XII

*Preparation of dodecylbenzenethionophosphonyl dichloride*

A mixture of 110 grams (0.445 mole) of dodecylbenzene, 184 grams (117.2 ml., 1.34 moles) of phosphorus trichloride, and 59.4 grams (0.445 mole) of aluminum chloride was stirred for 3 hours at 2–3° C. in a 500-ml., 3-necked flask equipped with a condenser protected from atmospheric moisture by a calcium chloride drying tube. Then 32 grams (1.0 mole) of sulfur was added and the mixture heated to about 50° C. for one hour. The product was then isolated by water hydrolysis of the reaction mass and extraction thereafter with naphtha. The naphtha was removed by vacuum distillation leaving a light red, fluid oil. Analysis gave 6.58 per cent P, 6.74 per cent S, and 19.96 per cent Cl. These values agree within sufficient degree to the theoretical values for dodecylbenzenethionophosphonyl dichloride of 8.18 per cent P, 8.44 per cent S, and 18.73 per cent Cl.

The dichloro product is obtained at the low reaction temperature shown. The monochloro product may be produced by using higher reaction temperatures as already noted for the conversion of waxbenzene.

EXAMPLE XIII

*Combined alkylation and production of the thiophosphorus chloro compounds*

This example illustrates a process which combines alkylation of an aromatic compound with conversion of the alkaryl reaction mass to an alkarylthionophosphonyl dichloride. It was found that the catalyst which serves in the alkylation step continues to serve in the subsequent conversion step, hence removal of the catalyst sludge from the alkylation reaction mass is unnecessary.

In a 500-ml., 3-necked flask equipped with a mechanical stirrer, a reflux condenser, and a dropping funnel were placed 121 grams (1.56 moles) of benzene and 5 grams (0.037 mole) of anhydrous aluminum chloride. This mixture was then heated to 60° C. and 173 grams of chlorinated paraffin wax (molecular weight 400, 16.39 per cent Cl) containing 0.8 gram atoms chlorine was added dropwise during one hour. This reaction mixture was then stirred at 60° C. for 2 hours more, after which the excess benzene was distilled out of the mixture under vacuum. The catalyst sludge as well as the waxbenzene alkylate remained in the reaction flask.

Then 322.9 grams (205 ml., 2.35 moles) of phosphorus trichloride and 104.2 grams (0.78 mole) additional of anhydrous aluminum chloride was added to the benzene-free waxbenzene alkylation mass and the resulting mixture was further reacted by stirring at room temperature for 3 hours. Then 50 grams (1.57 moles) of sulfur was added and the mixture was heated at 40-50° C. for one hour. The resulting sulfurized reaction mass was poured into warm water to hydrolyze the catalyst and the excess phosphorus trichloride. This aqueous mixture was extracted with naphtha. The naphtha solution was washed twice with water and filtered through diatomaceous earth. The solvent was then removed from the filtrate solution by vacuum distillation. The yield of solvent-free product was 393 grams of a clear, brown oil. Analysis gave 4.86 per cent P, 4.44 per cent S, and 9.94 per cent Cl. The P:S:Cl ratio calculated from these values is 1.0:0.9:1.8. This final product was identified as waxbenzenethionophosphonyl dichloride.

The foregoing thirteen examples have illustrated procedures for preparing the aromatic thionophosphonyl halides, including the novel alkaryl conversion products containing alkyl groups of about C10 to C30.

The examples which follow hereinafter illustrate the conversion of aromatic thionophosphonyl halides to the corresponding acids, esters, and salts by replacement of the halide constituent. These examples are particularly concerned with the novel compounds of my invention.

EXAMPLE XIV

*Potassium waxbenzenethionophosphonate*

A portion of the waxbenzenethionophosphonyl dichloride (4.86 per cent P, 5.10 per cent S, and 11.05 per cent Cl) prepared in Example VI was converted to the potassium thionophosphonate of structure,

according to the procedure which follows.

Waxbenzenethionophosphonyl dichloride in the amount of 100 grams was diluted with 250 ml. benzene. Then a solution of 30 grams potassium hydroxide dissolved in 200 ml. isopropyl alcohol was added. The resulting mixture was heated under reflux boiling for 3 hours. The reaction mass was cooled and 200 ml. more of benzene was added to promote precipitation of the byproducts, potassium chloride and water. The organic layer was removed from the precipitated material. It was then vacuum distilled to remove the solvents from it. Thus a light straw-colored viscous product, identified as the desired potassium thionophosphonate, was obtained. Analysis gave, 4.58 per cent P, 4.81 per cent S, and 11.3 per cent K.

EXAMPLE XV

*Waxbenzenethionophosphonic acid*

The conversion of the aromatic thionophosphonyl halides to the corresponding thionophosphonic acid of structure,

is not readily accomplished by simple hydrolysis because of their stability toward water. However, a convenient way for producing the free acid compound is accomplished by first forming a metal salt as described in preceding Example XIV. Accordingly, the potassium waxbenzenethionophosphonate of that example was converted to the free organic acid by a treatment with a mineral acid as follows.

In a 250 ml. Erlenmeyer flask, 18 grams of the above described potassium salt was mixed with an equal volume of benzene and an excess of 12 N. hydrochloric acid at room temperature. This mixture was shaken for 2 hours and near the end of this period was heated to 50° C. On standing, the organic layer separated from the acid and was drawn off. After water-washing the organic layer, the benzene solvent was stripped off by vacuum distillation. The product obtained and identified as waxbenzenethionophosphonic acid contained 5.10 per cent P, 5.35 per cent S, and 0.05 per cent residual K.

EXAMPLE XVI

*Preparation of zinc waxbenzenethionophosphonate in mineral oil solution*

A solution of 50 grams (0.09 mole) waxbenzenethionophosphonyl dichloride (4.86 per cent P, 5.10 per cent S, and 11.05 per cent Cl of Example VI) in 150 grams of mineral oil was reacted with 37.0 grams (0.45 mole) of zinc oxide in the presence of 5 ml. of water for 3 hours at 100-110° C. The reaction mass was then cooled and diluted with twice its volume of naphtha to facilitate separation of solids by centrifuging. It was centrifuged at 10,000 G for ½ hour. The centrifuged liquid was washed with water. The naphtha solvent was then removed by vacuum distillation. The product, an oil solution of zinc diwaxbenzenethionophosphonate, was a clear, yellow oil. Analysis of this oil solution gave 1.13 per cent P, 1.01 per cent S, 3.02 per cent Zn, and 0.34 per cent residual Cl. This stands in close agreement with the calculated analysis of 1.16 per cent P, 1.20 percent S, 2.46 per cent Zn, and zero Cl.

EXAMPLE XVII

*Preparation of dibutyl waxbenzenethionophosphonate*

Waxbenzenethionophosphonyl dichloride prepared according to procedure hereinabove described and analyzing 4.59 per cent P, 4.66 per cent S, and 10.24 per cent Cl was converted to an ester as follows:

A mixture of 45 grams of n-butyl alcohol and 47 grams of pyridine was placed in a reaction flask and cooled with an ice bath. To this mixture which was being stirred was added slowly a solution of 100 grams of waxbenzenethionophosphonyl dichloride in 50 ml. of naphtha. After this addition was completed, the mixture was stirred for one hour and then, after being allowed to warm to room temperature, the mixture was stirred for two more hours. Finally, it was heated to about 50° C. and stirred for one hour. The reaction mixture was then filtered to remove the precipitated pyridine hydrochloride. The naphtha was removed by vacuum distillation. Since a small amount of pyridine hydrochloride separated during this last operation, the mixture was diluted again with naphtha, filtered, and then washed first with a dilute hydrochloric acid solution and finally with water. The naphtha was vacuum distilled to leave a clear, light yellow, slightly viscous liquid product identified as dibutyl waxbenzenethionophosphonate. This product, which had only a very slight odor, was found to contain 5.24 per cent P, 4.35 per cent S, and a trace of residual chlorine.

The optimum conditions for producing aromatic thionophosphonyl chlorides in the practice of my invention are brought out in the following summary:

A. MOLES REAGENT PER MOLE OF AROMATIC MATERIAL

1. *Phosphorus trichloride.*—About 1.5–4 moles, and preferably about 3 moles when sulfurizing with sulfur, phosphorus sulfide, or sulfur halide but about two moles with thiophosphoryl chloride. When this agent gives up its sulfur it also regenerates one mole of phosphorus trichloride.
2. *Catalyst.*—About 0.8 to 1.5 moles, preferably at least about one mole.
3. *Sulfurizing agent.*—In an amount to provide about 1–3 gram atoms of sulfur and preferably 1–2 gram atoms.

B. COMBINING OF REACTANTS

The aromatic compound, catalyst, and phosphorus trichloride are combined and initially reacted. The reaction mass is then sulfurized; in the case of the thiophosphonyl chloride, however, this surfurizing agent may be added to the mixture prior to the initial reaction.

C. REACTION PERIOD

For preparing the dichlorophosphine complex prior to its sulfurization, a period of about 1–5 hours, preferably about 2.5–3 hours is optimum. A further reaction period of about 5–60 minutes suffices for reaction with an added sulfurizing reagent.

D. TEMPERATURE

About 0–90° C. The temperature, however, is further correlated with the molecular weight or complexity of the organic raw material. Low molecular weight material, e. g., benzene, may be reacted at about 70–80° C. High molecular weight aromatics such as dodecylbenzene and waxbenzene require temperatures below about 50° C. for the dichloro thiophosphorus products and up to about 90° C. for the monochloro thiophosphorus products.

Utilizing isolated organic halophosphines

The catalyst which I have found most effective for the sulfurization is anhydrous aluminum chloride. Aluminum bromide is also effective but less so than aluminum chloride. I have also used other polyvalent metal halides such as $BF_3$, $FeCl_3$, and $ZnCl_2$. Of the polyvalent metal halides, however, I prefer to use aluminum chloride. I found that the catalyst is effective in an unexpectedly low concentration of about 0.05–0.2 mole per mole of the organic halophosphine. Best results are secured by the use of about 0.08–0.15 mole of catalyst per mole of the organic halophosphine.

Product yield is also improved by the use of a solvent which is compatible with the reaction components. Relatively large amounts of catalyst and certain types of solvents hinder the reaction and markedly reduce the yield of the desired sulfurized product. The most suitable solvents which I have found are phosphorus trichloride and carbon disulfide. Other solvents such as benzene, naphtha, and cyclohexane are also satisfactory, in some instances, but to a lesser extent as reflected by slightly lower product yields. I found also that methylene chloride, carbon tetrachloride, and tetrachloroethane are not suitable solvents since dark and tarry reaction mixtures are produced. Nitropropane is also unsatisfactory. Of the solvents which I have found compatible with the reaction components, I prefer phosphorus trichloride. The solvent, of course, is readily recoverable from the process for reuse.

The principal reason for the use of a solvent at all is to facilitate control of the temperature of the reaction which is exothermic.

The sulfurizing agents which I employ constitute the group of sulfur, thiophosphoryl chloride ($PSCl_3$), and the sulfides of phosphorus such as phosphorus pentasulfide. Of these, I prefer to use sulfur for reasons of economy as well as effectiveness. The proportion of the sulfurizing agent to use is theoretically that amount which will provide one atom of available sulfur per mole of organic halophosphine. Practically, however, up to about a 10 per cent excess of more favorable to the reaction kinetics.

Specific examples which illustrate the practice of my invention follow hereinafter.

EXAMPLE I

*Aromatic phosphorus halide plus sulfur*

A 150-ml., 3-necked flask was fitted with a stirrer and a vertical water condenser to which was attached a calcium chloride drying tube with outlet open to the atmosphere. In this flask there was placed a mixture of 26 grams (0.14 mole, 19.5 ml.) of phenyldichlorophosphine, 1.5 grams (0.011 mole) of anhydrous aluminum chloride, and 24.5 ml. of phosphorus trichloride. To this mixture 6.4 grams (0.2 mole) of flowers of sulfur was then added whereupon a spontaneous exothermic reaction began. The temperature of the mixture increased to about 75° C. and remained there for about five minutes before beginning to decrease. To insure completion of the reaction, the mixture was finally heated to 80° C. for 2 to 3 minutes. If desired, the phosphorus trichloride solvent may be recovered at this point by vacuum distillation. In this case, however, the reaction mixture was immediately poured onto cracked ice. The water-insoluble portion was extracted twice with naphtha. The extracts were combined, dried, and filtered. The naphtha solvent was removed from the filtered extract solution by vacuum distillation. Further distillation gave a 26.5 gram fraction which was collected at 95–102° C. (1–2 mm. Hg). Analyses for this product which was a clear colorless liquid are shown in Table I below:

TABLE I

*Chemical analyses*

|  | Found | Calculated for $C_6H_5PSCl_2$ |
|---|---|---|
| Percent P | 14.5 | 14.7 |
| Percent S | 15.6 | 15.2 |
| Percent Cl | 33.0 | 33.6 |

This product obtained in 89.8 per cent yield was identified as benzenethionophosphonyl dichloride.

EXAMPLE II

*Varying the catalyst and solvent conditions*

Several experimental runs similar to Example I were made, in each of which 26 grams (0.14 mole, 19.5 ml.) of phenyldichlorophosphine was reacted with 6.4 grams (0.20 mole) of sulfur, but which otherwise differed as to catalyst concentrations (anhydrous aluminum chloride) and solvent used. The reaction time for each run was about 10 minutes. The product was isolated from each reaction by treatment with water, extraction with naphtha, and finally vacuum distillation of the naphtha extract. The variable factors of catalyst and solvent used in this series of runs are shown in Table II below, the effects of which are reflected in the reaction temperature and yield data also shown in the table.

TABLE II

*Effect of catalyst and solvent on $C_6H_5PCl_2S$*

| Run No. | Catalyst, moles $AlCl_3$/mole $C_6H_5PCl_2$ | Solvent Kind | Solvent Vol., ml. | Reaction initiates at °C. | Yield of $C_6H_5PSCl_2$ percent |
|---|---|---|---|---|---|
| 1 | 0 | 0 | 0 | 165 | 65.8 |
| 2 | 0.10 | 0 | 0 | 40 (goes to 120° C. uncontrollably). | 81.9 |
| 3 | 1.00 | 0 | 0 | 40 | 42.0 |
| 4 | 0 | $PCl_3$ | 24 | None at reflux, 76° C. | 0 |
| 5 | 0.05 | $PCl_3$ | 24 | do | 0 |
| 6 | 0.08 | $PCl_3$ | 24 | 30 | 89.8 |
| 7 | 0.25 | $PCl_3$ | 24 | 30 | 87.5 |
| 8 | 0.50 | $PCl_3$ | 24 | 30 | 87.1 |
| 9 | 1.00 | $PCl_3$ | 24 | 30 | 87.8 |
| 10 | 0.10 | $CS_2$ | 53 | 30 | 89.5 |
| 11 | 0.10 | $C_6H_6$ | 25 | 30 | 86.1 |
| 12 | 0.10 | Cyclohexane | 53 | 50 | 82.0 |
| 13 | 1.00 | Naphtha | 25 | 36 | 67.8 |

It will seem from the above results that the optimum proportion of catalyst is about 0.1 mole and that the best performing solvents therewith appear to be $PCl_3$ and $CS_2$. While run 2 using 0.1 mole catalyst gives a reasonably good product yield in the absence of a solvent, nevertheless the lack of a solvent makes control of the reaction temperature difficult; when the reaction took hold in this run, the temperature rose extremely rapidly to 120° C.

EXAMPLE III

*Aromatic phosphorus halide plus $PSCl_3$*

1. A mixture of 26 grams (0.14 mole, 19.5 ml.) of phenyldichlorophosphine and 23.7 grams (0.14 mole) of thiophosphoryl chloride was stirred and heated at reflux (pot temperature, 115–125° C.) for five minutes. There was no change in color, heat effect, or other visible evidence of a reaction. The benzenethionophosphonyl dichloride was then isolated as described in Example II. Yield of product was 12.9 grams (43.7 per cent).

2. A second run was made in the same way except that the reaction period was extended to one hour. The yield of product was 20.4 grams (69.2 per cent).

3. In a third run, 1.9 grams (0.014 mole) of aluminum chloride added to the mixture caused spontaneous exothermic reaction and only a five-minute reaction with further added heat to 92° C. was allowed. The yield of product was 23.3 grams (79.0 per cent).

Run 3 shows conclusively that the sulfurization reaction is remarkably improved, the time and temperature are substantially decreased, and the product yield is markedly increased. It will be noted in the case of thiophosphoryl chloride that this substance acts as a solvent for the reaction as well as a sulfurization reagent.

EXAMPLE IV

*Aromatic phosphorus halide plus $P_2S_5$*

A mixture was made of 26 grams (0.14 mole) phenyldichlorophosphine dissolved in 49 ml. phosphorus trichloride, 44.4 grams (0.20 mole) phosphorus pentasulfide, and 9.3 grams (0.07 mole) anhydrous aluminum chloride. This mixture was reacted by heating at reflux, about 80° C., for ten minutes and then when poured into cracked ice, the product, crude benzene thionophosphonyl dichloride ($C_6H_5PSCl_2$), was extracted with naphtha. The product extract was dried and clarified by clay filtration and the naphtha was vacuum distilled from the filtrate. Further distillation gave a yield of pure product fraction amounting to 59 per cent based on the phenyldichlorophosphine used.

When this preparation was made in the absence of the aluminum chloride, the product yield amounted to only 21.7 per cent.

EXAMPLE V

*Aliphatic phosphorus halide plus sulfur*

A. REACTION IS CATALYZED

A mixture of 25 grams (0.19 mole) ethyldichlorophosphine, 6.4 grams (0.20 mole) sulfur, and 50 grams benzene was stirred together at 26° C. while protected against contact with atmospheric moisture. The apparatus used consisted of a 250-ml., 3-necked flask fitted with stirrer, thermometer and a reflux condenser with drying tube at its outlet open to the atmosphere.

Upon formation of the above mixture, 2.7 grams (0.02 mole) anhydrous aluminum chloride was added while agitating the mixture. The reaction was immediate and exothermic causing a temperature rise to 35° C. Mild heating was then applied for 5 minutes, holding at 40° C.

The reacted mixture was poured into water, whereupon an organic bottom layer was formed. This layer was drawn off and distilled at reduced pressure (about 50 mm. Hg). A product fraction boiling at 78–81° C. and weighing 27.0 grams was obtained. Having an analysis of 18.6 per cent P, 19.4 per cent S, and 44.0 per cent Cl, this fraction was the desired ethyl thionophosphonyl dichloride; the theoretical values are 19.0 per cent P, 19.6 per cent S, and 43.6 per cent Cl. The product-fraction yield was 87.0 per cent.

B. CATALYST IS ABSENT

When the foregoing procedure was repeated in the absence of the $AlCl_3$ catalyst, no reaction occurred even on heating the mixture to 80° C.

When this mixture was cooled and poured into water, an organic top layer formed. This layer distilled completely at 80° C. and atmospheric pressure. It was identified only as benzene. It is apparent, therefore that a thiono sulfurization product was not formed in the absence of the catalyst, and that the water treatment had completely hydrolyzed the ethyl dichlorophosphine which had been used.

The optimum conditions for sulfurizing organic halophosphines to produce organic thionophosphonylhalides in the practice of my invention are brought out in the following summary:

A. PROPORTIONS OF REACTION COMPONENTS

1. *Catalyst.*—About 0.05 to 0.2 mole per mole of the organic halophosphine, and is optimum at about 0.08–0.15 mole. Anhydrous aluminum chloride is the preferred catalyst.
2. *Sulfurizing agent.*—Use an amount which provides from about one gram atom of available sulfur per gram mole of organic halophosphine to about twice this proportion.
3. *Solvent.*—Up to about 5 volumes per volume of organic halophosphine and preferably about 2 to 3 volumes. Although useful with the $PSCl_2$ sulfurizing agent, the solvent is particularly beneficial to the reaction when using the solid sulfurizing agents such as elemental sulfur and the phosphorus pentasulfide.

B. REACTION PERIOD

All of the reaction components are initially brought together and the reaction goes to completion in about 5–60 minutes; usually it is completed in about 10–20 minutes.

C. TEMPERATURE

About 0–90° C. The reaction is exothermic and usually spontaneous. Control of the temperature is facilitated by the presence of a suitable solvent. The optimum reaction temperature for the high molecular weight organic halophosphines should not exceed about 50° C. Ordinarily, in most instances, about 25–30° C. is the minimum for initiating the reaction.

The foregoing description and examples are not intended for undue limitation of my invention, the scope of which is defined in the claims appended hereto.

I claim as my invention:

1. The method of producing organic thiophosphonyl halides which comprises bringing together at atmospheric pressure and at a temperature of from about 0° to 90° C.
   (a) an organic halophosphine
   (b) a polyvalent metal halide catalyst of the Friedel-Crafts type
   (c) a sulfurizing agent for a length of time until reaction has substantially completely subsided; and then hydrolyzing and separating the polyvalent metal halide catalyst from the reaction mass, the quantity of said sulfurizing agent used, per mole of organic halophosphine being sufficient to provide from one to three gram atoms of sulfur.

2. A process in accordance with claim 1 characterized further in that reactants (a) and (b) are brought into the reaction mass in the form of an organic halophosphine-polyvalent metal halide catalyst complex resulting from the reaction of an aromatic hydrocarbon with $PCl_3$ in the presence of said catalyst in an amount equal to from .8 to 1.5 moles of catalyst per mole of aromatic hydrocarbon.

3. A process in accordance with claim 1 characterized further in that reactants (a) and (b) are brought into the reaction mass separately and the amount of said catalyst used in from about 0.08 to about .15 mole per mole of the organic halophosphine.

4. A process in accordance with claim 1 in which the sulfurizing agent is elemental sulfur.

5. A process in accordance with claim 1 in which the polyvalent metal halide catalyst is $AlCl_3$.

6. A process in accordance with claim 1 in which the halophosphine is phenyl dichlorophosphine.

7. A process in accordance with claim 1 in which the halophosphine is a derivative of an alkyl substituted benzene.

WARREN L. JENSEN.

References Cited in the file of this patent

UNITED STATES PATENTS

| Number | Name | Date |
|---|---|---|
| 2,174,019 | Sullivan | Sept. 26, 1939 |
| 2,314,929 | Flett | Mar. 20, 1943 |
| 2,471,472 | Woodstock | May 31, 1949 |

OTHER REFERENCES

Kosolapoff "Organophosphorus Compounds" (1950) pp. 43–46, 68, 69, 71, 75–77.